US009432382B2

(12) United States Patent
Lin et al.

(10) Patent No.: US 9,432,382 B2
(45) Date of Patent: Aug. 30, 2016

(54) TRANSMITTING AND RECEIVING SELF-DESTRUCTING MESSAGES

(71) Applicant: Verizon Patent and Licensing Inc., Arlington, VA (US)

(72) Inventors: Zhijian Lin, Dublin, CA (US); Amir Mayblum, Walnut Creek, CA (US); Jerry M. Kupsh, Concord, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 18 days.

(21) Appl. No.: 14/463,169

(22) Filed: Aug. 19, 2014

(65) Prior Publication Data
US 2016/0057156 A1 Feb. 25, 2016

(51) Int. Cl.
*H04L 29/06* (2006.01)

(52) U.S. Cl.
CPC ......... *H04L 63/108* (2013.01); *H04L 63/0428* (2013.01)

(58) Field of Classification Search
USPC .......................................................... 726/26
See application file for complete search history.

(56) References Cited

U.S. PATENT DOCUMENTS

| | | | | |
|---|---|---|---|---|
| 2007/0113101 | A1* | 5/2007 | LeVasseur | G06Q 10/107 713/189 |
| 2008/0281930 | A1* | 11/2008 | Hartselle | G06Q 10/107 709/206 |
| 2010/0241847 | A1* | 9/2010 | van der Horst | H04L 12/58 713/152 |
| 2014/0201527 | A1* | 7/2014 | Krivorot | G06F 21/6209 713/168 |
| 2015/0169893 | A1* | 6/2015 | Desai | G06F 21/60 726/1 |

FOREIGN PATENT DOCUMENTS

EP 1233584 * 8/2002

OTHER PUBLICATIONS

Wikipedia, "Snapchat", http://en.wikipedia.org/wiki/Snapchat, Aug. 18, 2014, 18 pages.
SpiffyNet Solutions, LLC., "DestructingMessage.com", http://www.destructingmessage.com/, 2006, 1 page.

* cited by examiner

*Primary Examiner* — Joseph P Hirl
*Assistant Examiner* — Chi Nguy

(57) ABSTRACT

A device may receive, from a first user device, a request to transmit a message to a user of a second user device. The request may include particular information indicating that content of the message is to be displayed to the user for a particular amount of time. The device may encrypt, based on receiving the request and using a key, the content of the message to obtain an encrypted message. The device may transmit the encrypted message to the second user device and receive, from the second user device, a request for the key. The device may transmit, to the second user device, the key and information identifying the particular amount of time to cause the second user device to decrypt the encrypted message, using the key, to obtain a decrypted message and cause the second user device to delete the decrypted message after the particular amount of time.

20 Claims, 14 Drawing Sheets

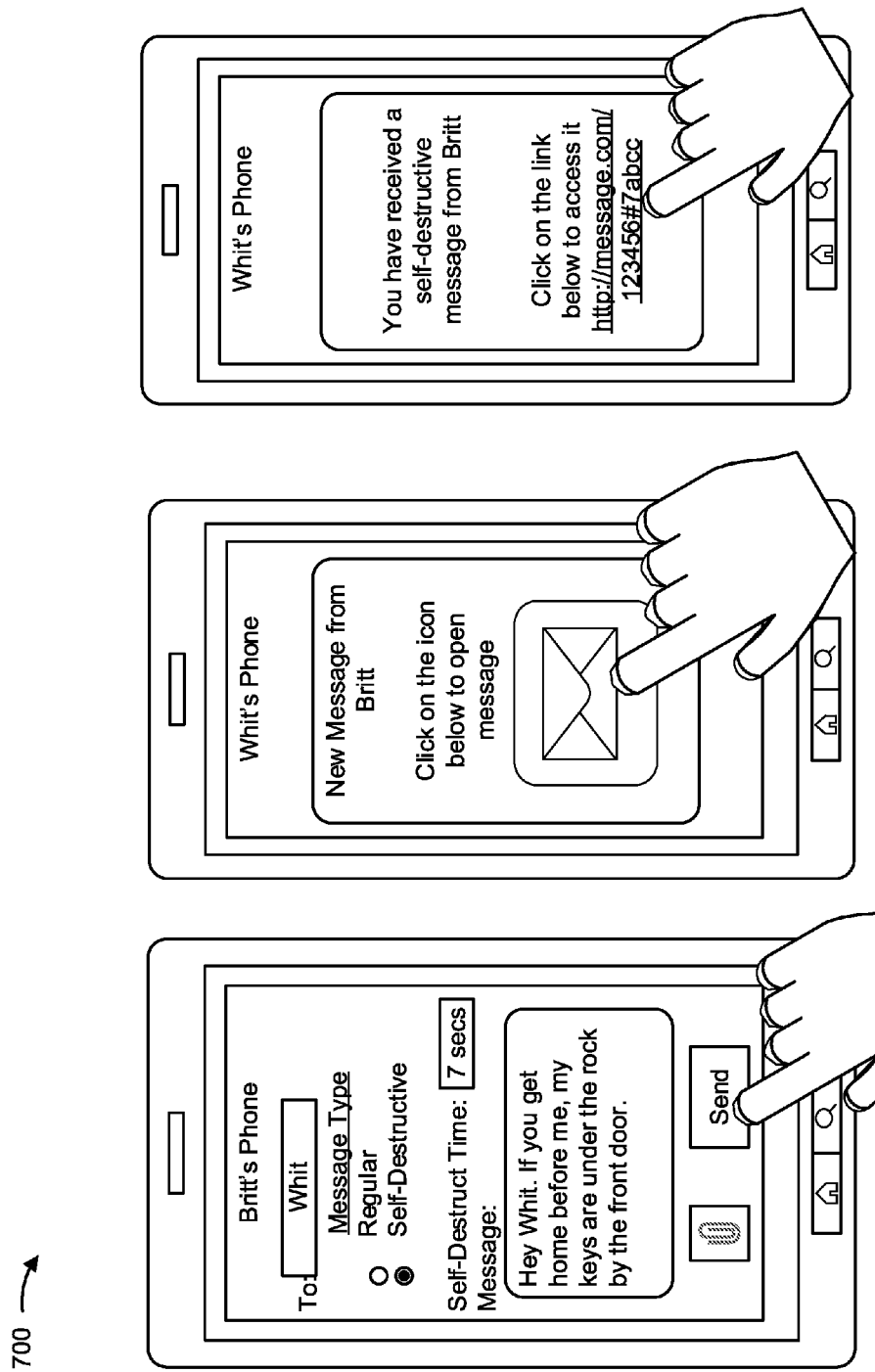

TRANSMITTING AND RECEIVING SELF-DESTRUCTING MESSAGES

BACKGROUND

A device may send a message to another device via a cellular network. The message may include a text message (e.g., a short message service ("SMS") message), a multimedia message (e.g., a multimedia messaging service ("MMS") message), or another type of message. The message may be displayed to a user of the other device.

BRIEF DESCRIPTION OF DRAWINGS

FIGS. 7A-7E are diagrams of an example of the process described with regard to FIGS. 6A and 6B.

DETAILED DESCRIPTION OF PREFERRED EMBODIMENTS

The following detailed description refers to the accompanying drawings. The same reference numbers in different drawings may identify the same or similar elements.

A user, associated with a sending device, may wish to send a self-destructing message (e.g., a self-destructing SMS message, a self-destructing MMS message, etc.) to another user, associated with a receiving device. However, the user may be required to use a third-party application to send the self-destructing message. For example, the user may be required to purchase, download, and/or use the third-party application (e.g., an application created by an entity that is not associated with a manufacturer of the sending device and/or not associated with a service provider associated with the sending device). Moreover, the user may be concerned with respect to the protection of the content of the self-destructing message, especially when using the third-party application. For example, the user may be uncertain that the content is encrypted and/or that the content is removed from the receiving device and from a server transmitting the self-destructing message. Similarly, the other user may be required to use the third-party application to receive the self-destructing message.

Systems and/or methods described herein may enable a device to transmit and receive self-destructing messages without the need to use a third-party application and may ensure the protection of content of the self-destructing messages.

As used herein, a self-destructing message may include a message that self-destructs after a particular period of time elapses after a recipient of the message accesses the message. For example, after the particular period of time elapses, the recipient may no longer be able to access the message.

Figure 1B:
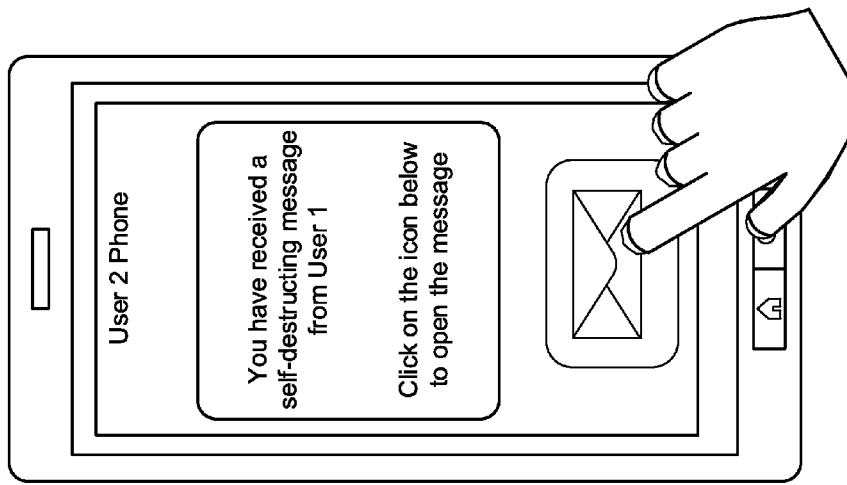
FIGS. 1A-1D are diagrams of an overview of an implementation described herein.
Figure 1A:
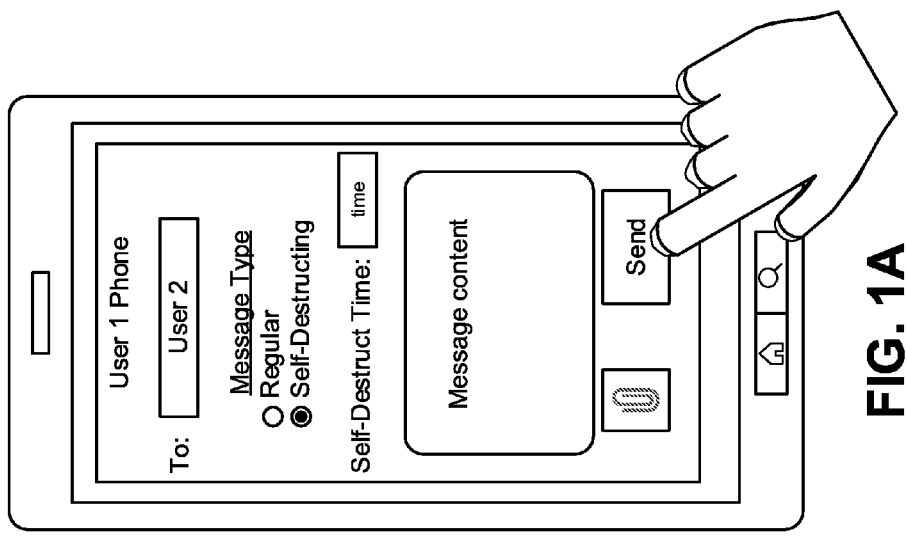

FIGS. 1A-1D are diagrams of an overview of an implementation described herein. As shown in FIG. 1A, assume that a first user is using a messaging application of a first user device (e.g., a smart phone) to send a message. As shown as an example in FIG. 1A, the first user has identified a second user as a recipient of the message and has identified the type of the message as self-destructing. As further shown as an example in FIG. 1A, the first user has submitted content of the message and has identified a self-destructing time for displaying the content of the message (e.g., an amount of time, following the second user accessing the content of the message, after which the content of message will no longer be available to the second user).

As shown in FIG. 1B, assume that the first user has caused the message to be transmitted to the second user and that a second user device, of the second user, has received the message. As further shown in FIG. 1B, assume that a messaging application of the second user device has been initiated. As shown as an example in FIG. 1B, the second user device, via the messaging application, may notify the second user that a self-destructing message has been received from the first user and may display an icon indicating that a message has been received. As further shown as an example in FIG. 1B, the second user device, via the messaging application, may instruct the second user to select the icon to access the message.

Figure 1C:
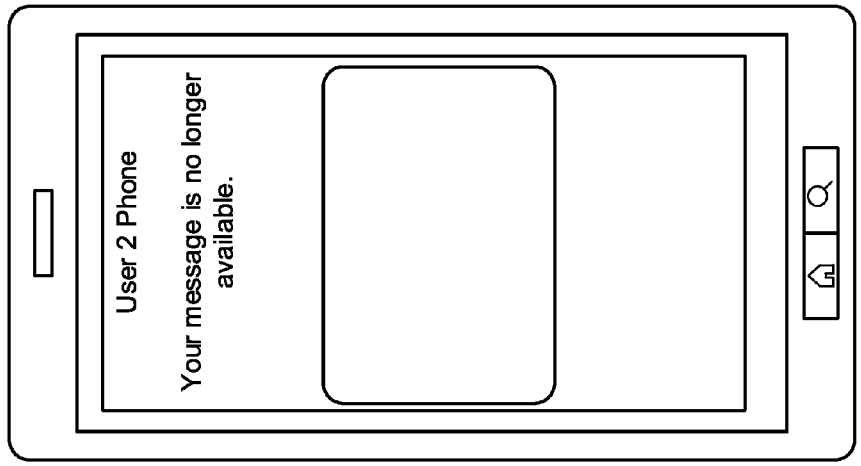
Figure 1D:
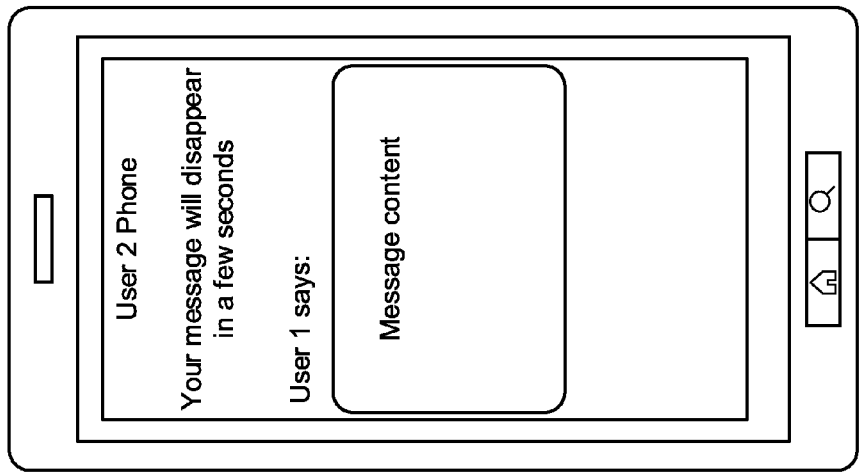

As shown in FIG. 1C, assume that the second user has selected the icon. As shown as an example in FIG. 1C, the second user device may display the content of the message via the messaging application. As further shown as an example in FIG. 1C, the second user device, via the messaging application, may notify the second user that the message will disappear in a particular amount of time (e.g., a few seconds). As shown in FIG. 1D, assume that the particular amount of time has expired. As shown as an example in FIG. 1D, the second user device may no longer display the content of the message.

Thus, systems and/or methods described herein may enable a user device to transmit and receive self-destructing messages without using a third-party application.

Figure 2A:
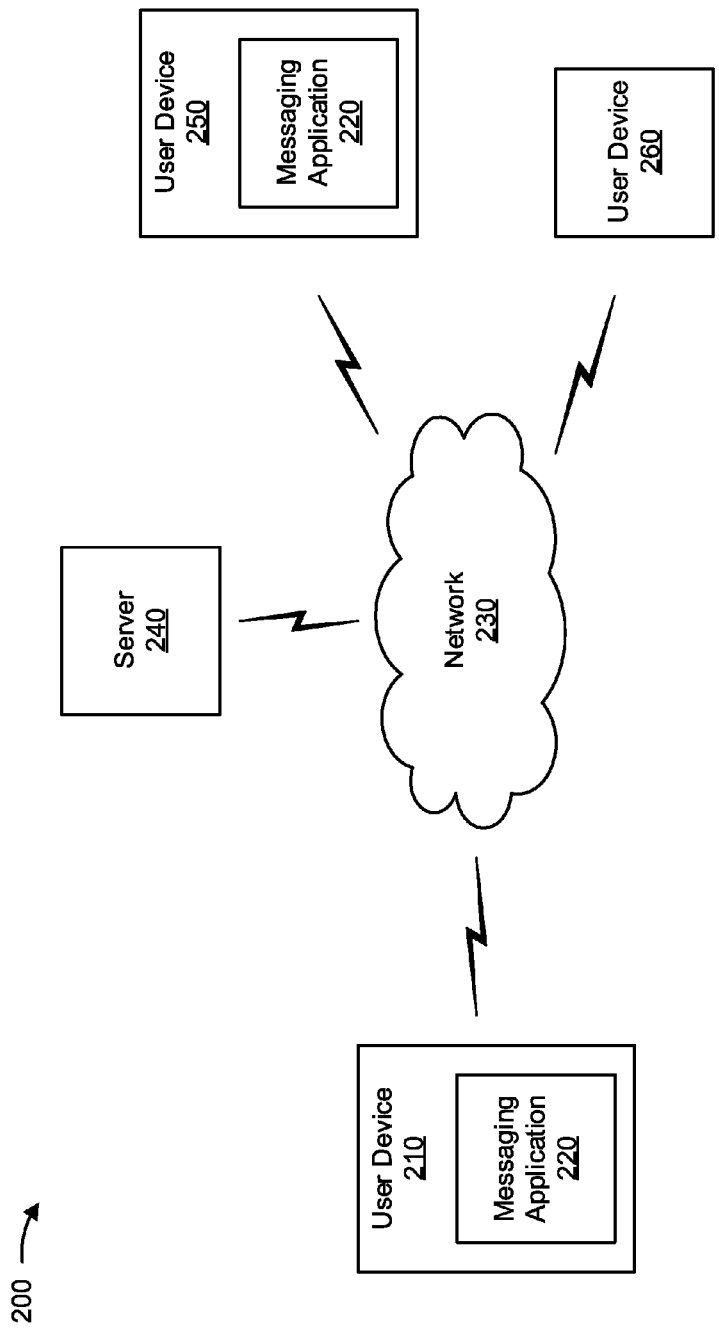
FIGS. 2A and 2B are diagrams of example environments in which systems and/or methods described herein may be implemented.

FIG. 2A is a diagram of an example environment 200 in which systems and/or methods described herein may be implemented. Environment 200 may include a user device 210, a network 230, a server 240, a user device 250, and a user device 260. The devices of environment 200 may communicate via wired connections, wireless connections, or a combination of wired connections and wireless connections.

User device 210 may include one or more devices that are capable of transmitting and receiving self-destructing messages. For example, user device 210 may include a smart phone, a desktop computer, a laptop computer, a tablet computer, a gaming device, and/or another type of wired or wireless user device. In some implementations, user device 210 may include messaging application 220 that facilitates the transmission and receipt of messages. For example, user device 210 may be preloaded with messaging application 220. Additionally, or alternatively, user device 210 may download messaging application 220.

Network 230 may include one or more wired and/or wireless networks. For example, network 230 may include a cellular network, a public land mobile network ("PLMN"), a second generation ("2G") network, a third generation ("3G") network, a fourth generation ("4G") network, a fifth generation ("5G") network, a long term evolution ("LTE") network, and/or a similar type of network. Additionally, or alternatively, network 230 may include a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, a satellite network, a cloud computing network, and/or a combination of these or other types of networks.

Server 240 may include one or more server devices. In some implementations, server 240 may receive and store messages (e.g., self-destructing messages and non-self-destructing messages) from user device 210 and user device 250. Additionally, or alternatively, server 240 may transmit messages (e.g., self-destructing messages and non-self-destructing messages) to user device 210, user device 250, and user device 260. Additionally, or alternatively, server 240 may transmit messaging application 220 to user device 210 and user device 250. Additionally, or alternatively, server 240 may receive and store information regarding user devices (e.g., user device 210, user device 250, and/or user device 260). For example, server 240 may receive, from a user device, information identifying a user of the user device and information identifying the user device, such as a telephone number associated with the user device, a network address associated with the user device, or the like. Additionally, or alternatively, server 240 may store content of messages (e.g., after encrypting the content), store information regarding the content (e.g., size of the content), store information identifying senders and recipients of the messages, information identifying self-destructing times associated with the messages, or the like.

User device 250 may include one or more devices, similar to user device 210, that are capable of transmitting and receiving self-destructing messages. As shown in FIG. 2A, user device 250 may include messaging application 220.

User device 260 may include one or more devices, similar to user device 210, that are capable of receiving self-destructing messages. As shown in FIG. 2A, user device 260 may not include messaging application 220.

Figure 2B:
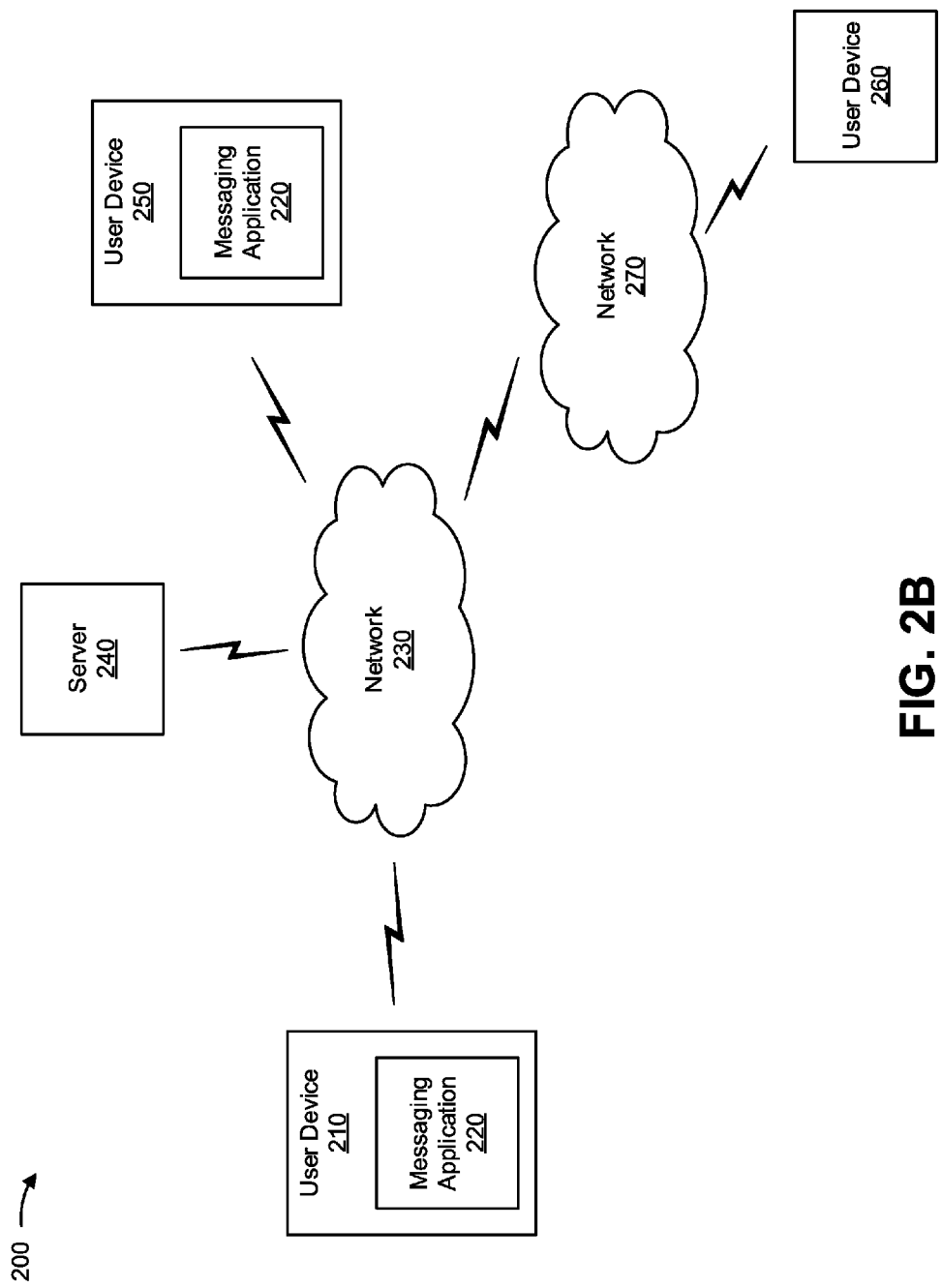

FIG. 2B is a diagram of another example environment 200 in which systems and/or methods described herein may be implemented. Environment 200 may include user device 210, network 230, server 240, user device 250, user device 260, and a network 270. The devices of environment 200 may communicate via wired connections, wireless connections, or a combination of wired connections and wireless connections.

User device 210, network 230, server 240, user device 250, and user device 260 may be similar to like devices (e.g., user device 210, server 240, user device 250, and user device 260) and networks (e.g., network 230) described above with regard to FIG. 2A.

Network 270 may include one or more wired and/or wireless networks, similar to network 230. In some implementations, network 270 may be associated with a different service provider than network 230. In other words, network 230 may be associated with a first service provider, while network 270 may be associated with a second service provider, such as a third party service provider. In some implementations, users of user device 210 and user device 250 may be customers of the service provider of network 230, and a user of user device 260 may be a customer of the service provider of network 270.

The number and arrangement of devices and networks shown in FIGS. 2A and 2B are provided as an example. In practice, there may be additional devices and/or networks, fewer devices and/or networks, different devices and/or networks, or differently arranged devices and/or networks than those shown in FIGS. 2A and 2B. Furthermore, two or more devices shown in FIGS. 2A and 2B may be implemented within a single device, or a single device shown in FIGS. 2A and 2B may be implemented as multiple, distributed devices. Additionally, or alternatively, a set of devices (e.g., one or more devices) of environment 200 may perform one or more functions described as being performed by another set of devices of environment 200.

Figure 3:
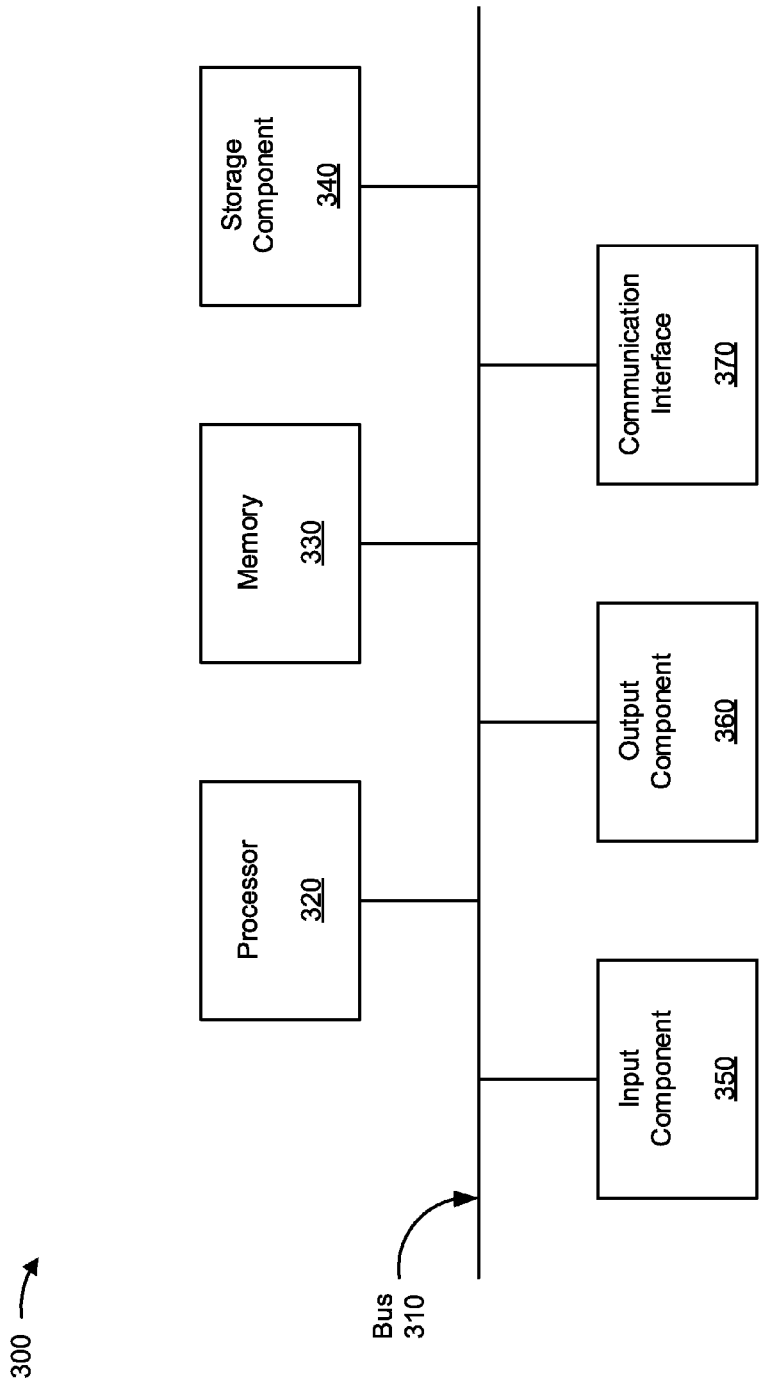
FIG. 3 is a diagram of example components of one or more devices of FIG. 2.

FIG. 3 is a diagram of example components of a device 300. Device 300 may correspond to user device 210, server 240, user device 250, and/or user device 260. Additionally, or alternatively, each of user device 210, server 240, user device 250, and/or user device 260 may include one or more devices 300 and/or one or more components of device 300. As illustrated in FIG. 3, device 300 may include a bus 310, a processor 320, a memory 330, an input component 340, an output component 350, and a communication interface 360.

Bus 310 may include a path that permits communication among the components of device 300. Processor 320 may include a processor (e.g., a central processing unit, a graphics processing unit, an accelerated processing unit), a microprocessor, and/or any processing logic (e.g., a field-programmable gate array ("FPGA"), an application-specific integrated circuit ("ASIC"), etc.) that interprets and/or executes instructions. Memory 330 may include a random access memory ("RAM"), a read only memory ("ROM"), and/or another type of dynamic or static storage device (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a camera, a microphone, a switch, etc.). Output component 350 may include a component that outputs information from device 300 (e.g., a display, an audio speaker, one or more light-emitting diodes ("LEDs"), etc.).

Communication interface 360 may include a transceiver-like component, such as a transceiver and/or a separate receiver and transmitter that enables device 300 to communicate with other devices, such as via a wired connection, a wireless connection, or a combination of wired and wireless connections. For example, a communication interface 360 may include an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions included in a computer-readable medium, such as memory 330. A computer-readable medium is defined as a non-transitory memory device. A memory device includes memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided for explanatory purposes. In practice, device 300 may include additional components, fewer components, different components, or differently arranged components than those shown in FIG. 3.

Figure 4A:
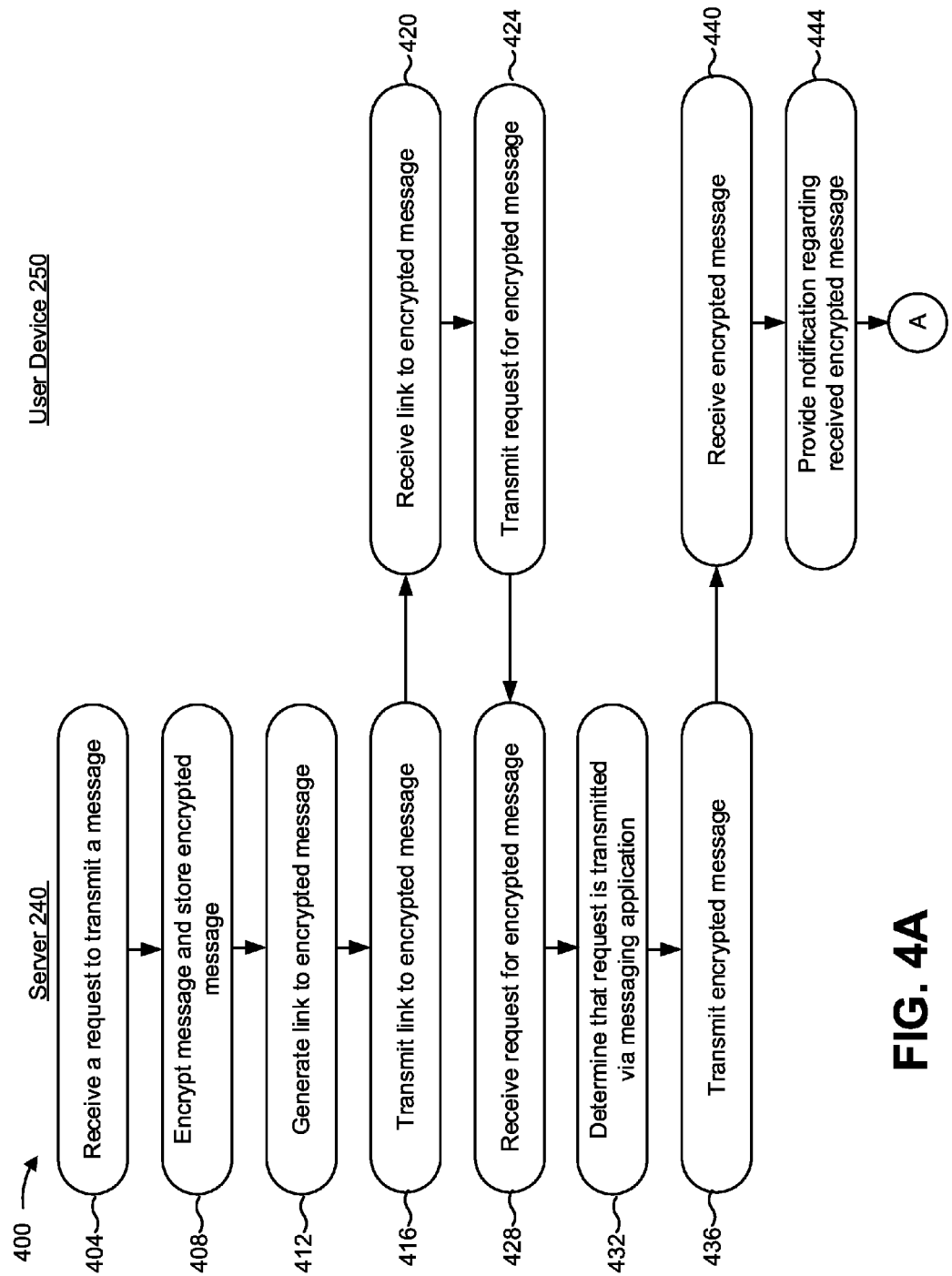
FIGS. 4A and 4B are flow charts of an example process for transmitting and receiving a self-destructing message.
Figure 4B:
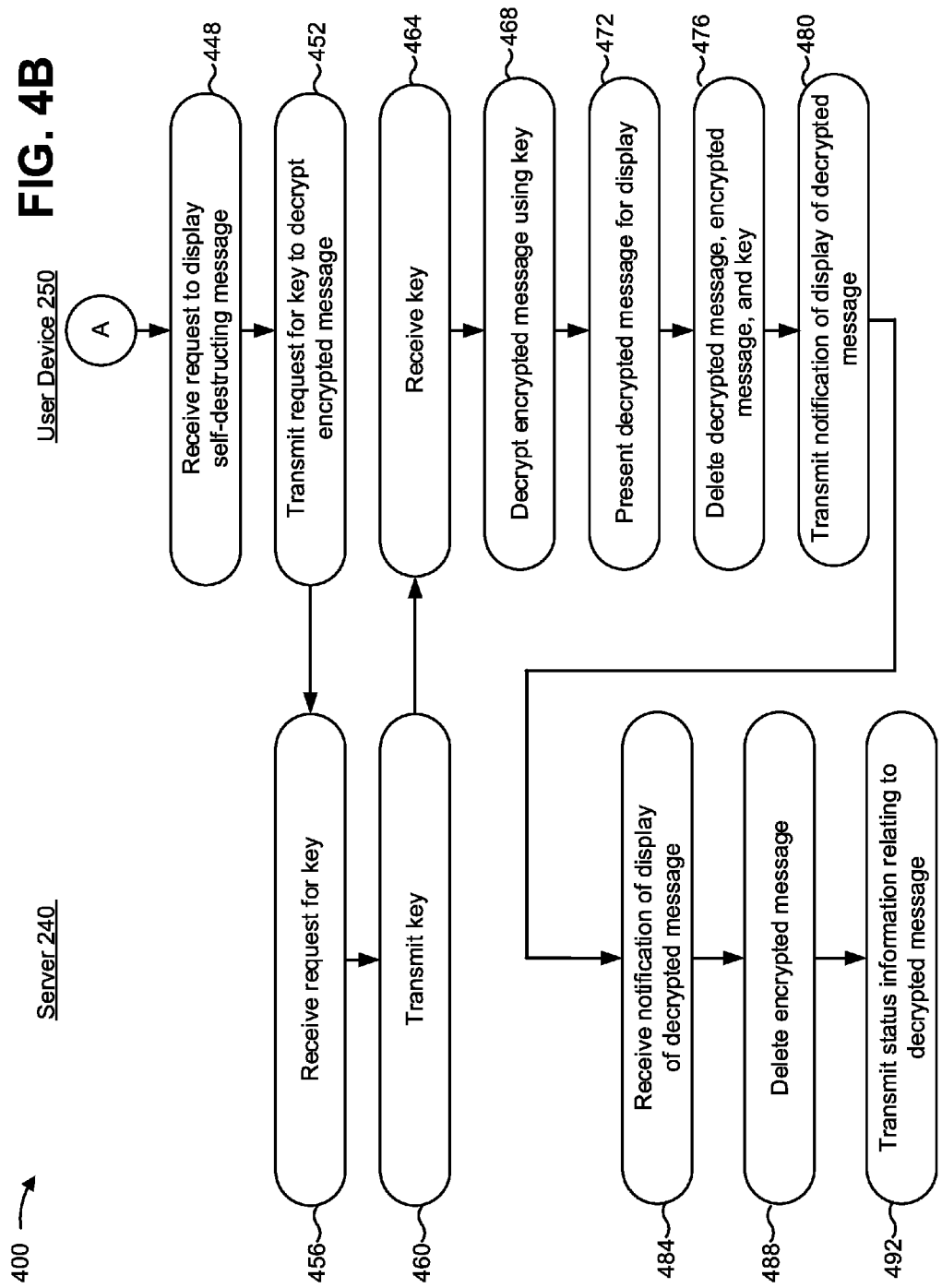

FIGS. 4A and 4B are flowcharts of an example process 400 for transmitting and receiving a self-destructing message. In some implementations, process 400 may be performed by server 240 and user device 250. In some implementations, one or more process blocks of FIGS. 4A and 4B may be performed by another device or a group of devices separate from or including server 240 and user device 250.

As shown in FIG. 4A, process 400 may include receiving a request to transmit a message (block 404). For example, server 240 may receive a request, from user device 210, to transmit a message (e.g., an SMS message or an MMS message) to user device 250. For instance, a user of user device 210 may identify user device 250 as a recipient of the message, identify a type of the message as a self-destructing message, identify a self-destructing time associated with the message, submit content of the message, and submit the request via messaging application 220, in a manner similar to that discussed herein in connection with FIG. 1A.

In some implementations, the request may include the content of the message, information identifying user device 210, and information identifying user device 250. For example, the content of the message may include textual information and/or visual information (e.g., information identifying an image, information identifying a video, etc.). Additionally, or alternatively, the request may include information identifying a size of the content of the message. Additionally, or alternatively, the request may include information indicating that the content of the message is to be displayed to the user of user device 250 for only a particular amount of time. For example, the request may include information identifying the type of the message as a self-destructing message and/or information identifying the self-destructing time.

In some implementations, if the information identifying the self-destructing time identifies a default self-destructing time (e.g., because the user of user device 210 did not identify a particular self-destructing time), server 240 may determine the self-destructing time for the message. For example, server 240 may determine the self-destructing time based on self-destructing times previously identified by the user of user device 210 and/or previously identified by other users. For instance, server 240 may determine an average of the self-destructing periods of time. Additionally, or alternatively, server 240 may determine the self-destructing time based on particular self-destructing times (e.g., last used self-destructing times, self-destructing times used more than a threshold amount of times, etc.). Additionally, or alternatively, server 240 may determine the self-destructing time based on the size of the content. For example, server 240 may identify a longer self-destructing time for a larger-sized message content, and a shorter self-destructing time for a smaller-sized message content.

In some implementations, server 240 may receive the request as a Hypertext Transfer Protocol (HTTP) request or a Hypertext Transfer Protocol Secure (HTTPS) request. For example, messaging application 220 of user device 210 may submit the request as an HTTP request or as an HTTPS request.

In some implementations, server 240 may store information identifying user device 210, information identifying user device 250, the information identifying the type of the message, the information identifying the size of the content of the message, and the information identifying the self-destructing time in a memory associated with server 240, such as a memory internal to server 240 and/or a memory external to server 240.

As further shown in FIG. 4A, process 400 may include encrypting the message and storing the encrypted message (block 408). For example, server 240 may encrypt the content of the message received from user device 210, based on receiving the request to transmit the message, to obtain an encrypted message. In some implementations, server 240 may determine that the content of the message is to be encrypted based on the request including the information identifying the type of the message as a self-destructing message and/or the information identifying the self-destructing time.

In some implementations, server 240 may encrypt the content of the message using one or more various encryption and/or cryptographic techniques and/or algorithms. For example, server 240 may use a key to encrypt the content of the message. In some implementations, server 240 may generate the key based on the information included in the request. For example, server 240 may generate the key based on the content of the message, the information identifying user device 250, the information identifying the type of the message, and/or the information identifying the self-destructing time. Additionally, or alternatively, server 240 may generate the key based on one or more keys used by server 240 to encrypt the content of one or more other messages. In some implementations, the key may be the same as the one or more keys or may be different than the one or more keys.

In some implementations, server 240 may store the encrypted message and the key used to encrypt the content of the message. For example, server 240 may store the encrypted message and the key in the memory associated with server 240. Additionally, or alternatively, server 240 may store information identifying a status associated with the encrypted message in the memory associated with server 240.

As further shown in FIG. 4, process 400 may include generating a link to the encrypted message (block 412). For example, after storing the encrypted message, server 240 may generate a link that may be used by user device 250 to obtain the encrypted message. In some implementations, the link may include a uniform resource locator (URL) that may be used by user device 250 to obtain the encrypted message. In some implementations, server 240 may generate the link based on various pieces of information, such as information identifying server 240, information identifying the memory associated with server 240, and/or the information included in the request. For example, server 240 may include, in the link, information identifying server 240 and/or information identifying the memory associated with server 240. Additionally, or alternatively, server 240 may include, in the link, an identifier of the encrypted message. For example, server 240 may assign the identifier to the encrypted message and may include the identifier in the link.

In some implementations, server 240 may store the identifier of the encrypted message, in association with the encrypted message and the key, in the memory associated with server 240.

As further shown in FIG. 4A, process 400 may include transmitting the link to the encrypted message (block 416). For example, after generating the link to the encrypted message, server 240 may transmit the link to user device 250. In some implementations, server 240 may transmit the link to user device 250 via a text message. For example, server 240 may include the link in an SMS message and may transmit the SMS message, including the link, to user device 250. Additionally, or alternatively, server 240 may transmit the link to user device 250 via another type of messaging service, such as an MMS message.

As further shown in FIG. 4A, process 400 may include receiving the link to the encrypted message (block 420). For example, user device 250 may receive the link transmitted by server 240. In some implementations, messaging application 220 of user device 250 may obtain the link, and may determine that the link identifies the encrypted message and that the encrypted message is associated with a self-destructing message. For example, messaging application 220 may analyze the link (e.g., analyze the format of the link) and determine, based on analyzing the link, that the link identifies the encrypted message. For instance, messaging application may identify the identifier of the encrypted message included in the link based on analyzing the link. Additionally, or alternatively, messaging application 220 of user device 250 may identify the information identifying server 240 and/or the information identifying the memory associated with server 240 based on analyzing the link. In some implementations, messaging application 220 of user device 250 may access the SMS message and obtain the link included in the SMS message after accessing the SMS message.

As further shown in FIG. 4A, process 400 may include transmitting a request for the encrypted message (block 424). For example, after determining that the link identifies the encrypted message associated with a self-destructing message, messaging application 220 of user device 250 may transmit the request for the encrypted message to server 240 to download the encrypted message. In some implementations, messaging application 220 of user device 250 may transmit the request for the encrypted message using the link. For example, messaging application 220 of user device 250 may transmit an HTTP request or an HTTPS request, for the encrypted message, to server 240 using the link. In some implementations, the request for the encrypted message may include information indicating that the request is transmitted via messaging application 220. For example, the request for the encrypted message may include information identifying messaging application 220. Additionally, or alternatively, the request may include the information identifying server 240, the information identifying the memory associated with server 240, and/or the identifier of the encrypted message. In some implementations, messaging application 220 may modify the link to include the information indicating that the request is transmitted via messaging application 220 and may transmit the request using the modified link.

As further shown in FIG. 4A, process 400 may include receiving the request for the encrypted message (block 428). For example, server 240 may receive the request for the encrypted message transmitted by user device 250.

As further shown in FIG. 4A, process 400 may include determining that the request is transmitted via a messaging application (block 432). For example, server 240 may determine that the request, for the encrypted message, is transmitted via messaging application 220. In some implementations, server 240 may analyze the request to determine that the request, for the encrypted message, is transmitted via messaging application 220. For example, server 240 may analyze the request to determine that the request includes the information indicating that the request is transmitted via messaging application 220.

As further shown in FIG. 4A, process 400 may include transmitting the encrypted message (block 436). For example, based on determining that the request is transmitted via messaging application 220, server 240 may retrieve and transmit the encrypted message to user device 250. In some implementations, server 240 may retrieve the encrypted message based on the information identifying the memory associated with server 240 and the identifier of the encrypted message. For example, server 240 may identify the information identifying the memory associated with server 240 and the identifier of the encrypted message, from the request for the encrypted message, and may retrieve the encrypted message from the memory associated with server 240 using the information identifying the memory associated with server 240 and the identifier of the encrypted message. In some implementations, server 240 may transmit the encrypted message via HTTP or HTTPs. For example, server 240 may transmit the encrypted message as an HTTP response or an HTTPS response.

In some implementations, server 240 may update the information identifying the status associated with the encrypted message. For example, server 240 may update the information identifying the status, in the memory associated with server 240, to indicate that the encrypted message has been transmitted to user device 250. In some implementations, server 240 may transmit the updated information identifying the status to user device 210 based on transmitting the encrypted message. For example, the updated information identifying the status may indicate that the message has been delivered. Additionally, or alternatively, server 240 may transmit the updated information identifying the status to user device 210 based on receiving a request, from user device 210, for the status. For example, server 240 may receive, from user device 210, the request for the status via Internet Message Access Protocol (IMAP) and may transmit the updated information identifying the status, to user device 210, via IMAP.

As further shown in FIG. 4A, process 400 may include receiving the encrypted message (block 440). For example, user device 250 may receive the encrypted message transmitted by server 240. In some implementations, user device 250 may store the encrypted message. For example, user device 250 may stored the encrypted message in a memory associated with user device 250, such as a memory that is internal to user device 250 and/or a memory that is external to user device 250.

As further shown in FIG. 4A, process 400 may include providing a notification regarding the received encrypted message (block 444). For example, based on receiving the encrypted message, messaging application 220 of user device 250 may provide a notification, to a user of user device 250, that a self-destructing message has been received. In some implementations, messaging application 220 may provide graphical information for display to the user. For example, the graphical information may be a representation of the self-destructing message. For instance, messaging application 220 may provide an icon or a button representing the self-destructing message. Additionally, or alternatively, messaging application 220 may provide textual information for display to the user. For example, the textual information may indicate that the self-destructing message has been received, may identify the user of user device 210 as a sender of the self-destructing message, and may provide instructions regarding an action, to be performed by the user, to cause the self-destructing message to be displayed. For instance, the instructions may direct the user to select the icon or the button to cause the self-destructing message to be displayed. Additionally, or alternatively, messaging application 220 may provide, to a user of user device 250, audible information indicating that the self-destructing message has been received. Additionally, or alternatively, messaging application 220 may cause user device 250 to vibrate or provide another type of sensory feedback.

As shown in FIG. 4B, process 400 may include receiving a request to display the self-destruction message (block 448). For example, based on the user selecting the icon or the button provided as part of the notification, messaging application 220 of user device 250 may receive the request to display the self-destruction message.

As further shown in FIG. 4B, process 400 may include transmitting a request for the key to decrypt the encrypted message (block 452). For example, based on receiving the request to display the self-destruction message, messaging application 220 of user device 250 may transmit the request for the key to decrypt the encrypted message. In some implementations, messaging application 220 of user device 250 may include, in the request, information requesting the key along with the information identifying server 240, the information identifying the memory associated with server 240, and/or the identifier of the encrypted message. In some implementations, messaging application 220 of user device 250 may transmit the request based on the link to the encrypted message. For example, messaging application 220 of user device 250 may modify the link to include the information requesting the key and may transmit the request based on the modified link. For instance, user device 250 may transmit an HTTP request or an HTTPS request, for the key, to server 240 using the modified link.

As further shown in FIG. 4B, process 400 may include receiving the request for the key (block 456). For example, based on determining that the request is transmitted via messaging application 220, server 240 may receive the request for the key transmitted by user device 250.

As further shown in FIG. 4B, process 400 may include transmitting the key (block 460). For example, based on receiving the request for the key, server 240 may retrieve and transmit the key to user device 250. In some implementations, server 240 may retrieve the key based on the information identifying the memory associated with server 240, the identifier of the encrypted message, and/or the information requesting the key included in the request. For example, server 240 may determine that the key is to be retrieved based on the information requesting the key and may search the memory associated with server 240 using the identifier of the encrypted message to identify the key. As explained above, the key may be stored, in the memory associated with server 240, in associated with the identifier of the encrypted message.

Additionally, or alternatively, server 240 may retrieve and transmit the information identifying the self-destructing time to user device 250. For example, based on receiving the request for the key, server 240 may search the memory associated with server 240 (e.g., using the identifier of the encrypted message) to identify the information identifying the self-destructing time. In some implementations, server 240 may transmit the key and the information identifying the self-destructing time, to user device 250, via HTTP or HTTPS. For example, server 240 may transmit the key and the information identifying the self-destructing time as an HTTP response or an HTTPS response to user device 250. Additionally, or alternatively, server 240 may retrieve and transmit the information identifying the self-destructing time to user device 250 prior to receiving the request for the key, such as with the encrypted message.

As further shown in FIG. 4B, process 400 may include receiving the key (block 464). For example, messaging application 220 of user device 250 may receive the key transmitted by server 240. In some implementations, messaging application 220 of user device 250 may cause the key to be stored in the memory associated with user device 250.

As further shown in FIG. 4B, process 400 may include decrypting the encrypted message using the key (block 468). For example, messaging application 220 of user device 250 may decrypt the encrypted message using the key received from server 240. In some implementations, messaging application 220 of user device 250 may obtain the encrypted message from the memory associated with user device 250 and may decrypt the encrypted message using the key to obtain a decrypted message that includes the content of the message.

As further shown in FIG. 4B, process 400 may include presenting the decrypted message for display (block 472). For example, messaging application 220 of user device 250 may cause the decrypted message to be displayed (e.g., to the user of user device 250). In some implementations, messaging application 220 of user device 250 may cause the decrypted message to be displayed for the self-destructing time via a display of user device 250. For example, messaging application 220 of user device 250 may identify the self-destructing time, from the information identifying the self-destructing time, and may cause the decrypted message to be displayed for the self-destructing time. After expiration of the self-destructing time, messaging application 220 of user device 250 may cause the decrypted message to be removed from the display of user device 250.

As further shown in FIG. 4B, process 400 may include deleting the decrypted message, the encrypted message, and the key (block 476). For example, messaging application 220 of user device 250 may cause the decrypted message, the encrypted message, and the key to be deleted, after expiration of the self-destructing time, from the memory associated with user device 250. In some implementations, messaging application 220 of user device 250 may determine that the self-destructing time has expired and may delete the decrypted message, the encrypted message, and the key from the memory associated with user device 250 based on determining that the self-destructing time has expired.

As further shown in FIG. 4B, process 400 may include transmitting a notification of display of the decrypted message (block 480). For example, after displaying the decrypted message, messaging application 220 of user device 250 may transmit, to server 240, the notification of display of the decrypted message. For instance, the notification may indicate that the decrypted message has been displayed. In some implementations, the notification may include the identifier of the encrypted message. For example, messaging application 220 of user device 250 may obtain the identifier of the encrypted message from the link to the encrypted message and may include the identifier in the notification.

As further shown in FIG. 4B, process 400 may include receiving the notification of display of the decrypted message (block 484). For example, server 240 may receive the notification of display of the decrypted message transmitted by messaging application 220 of user device 250.

As further shown in FIG. 4B, process 400 may include deleting the encrypted message (block 488). For example, based on receiving the notification, server 240 may delete the encrypted message from the memory associated with server 240. In some implementations, server 240 may identify the encrypted messaged based on the identifier of the encrypted message included in the notification. For example, server 240 may search the memory associated with server 240, using the identifier, to identify the encrypted message and may delete the encrypted message from the memory associated with server 240. Additionally, or alternatively, server 240 may delete information associated the encrypted message. For example, server 240 may delete the key, information identifying user device 210, information identifying user device 250, the information identifying the type of the message, the information identifying the size of the content of the message, and/or the information identifying the self-destructing time.

As further shown in FIG. 4B, process 400 may include transmitting status information relating to the decrypted message (block 492). For example, after receiving the notification of display of the decrypted message, server 240 may transmit the status information to user device 210. For instance, the status information may indicate that the content of the message has been displayed by user device 250. In some implementations, server 240 may update the information identifying the status associated with the encrypted message after receiving the notification and may include the update information identifying the status in the status information. For example, server 240 may update the information identifying the status, in the memory associated with server 240, to indicate that the encrypted message has been decrypted to obtain the decrypted message and that the decrypted message has been displayed to the user of user device 250. In some implementations, server 240 may transmit the status information to user device 210 based on receiving the notification. Additionally, or alternatively, server 240 may transmit the status information based on receiving a request, from user device 210, for the status information. For example, server 240 may receive, from user device 210, the request for the status information via IMAP and may transmit the status information, to user device 210, via IMAP.

Although FIGS. 4A and 4B show example blocks of process 400, in some implementations, process 400 may include additional blocks, fewer blocks, different blocks, or differently arranged blocks than those depicted in FIGS. 4A and 4B. Additionally, or alternatively, two or more of the blocks of process 400 may be performed in parallel.

FIGS. 5A-5D are diagrams of an example 500 of process 400 described above with respect to FIGS. 4A and 4B. For the purposes of example 500, assume that messaging application 220 has been installed onto user device 210 and user device 250. Further assume that Bev, a user associated with user device 210, has initiated messaging application 220 to transmit a self-destructing message to Britt, a user associated with user device 250.

Figure 5B:
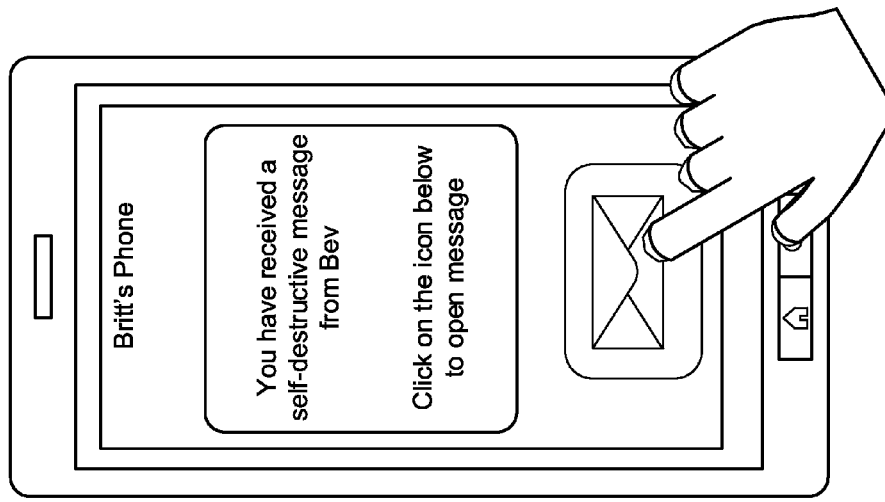
FIGS. 5A-5D are diagrams of an example of the process described with regard to FIGS. 4A and 4B.
Figure 5A:
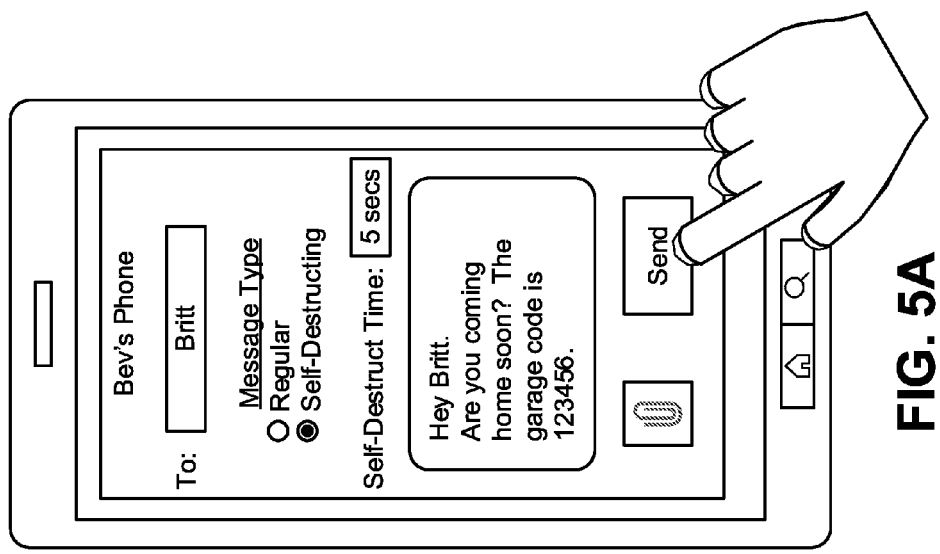

As shown in relation to FIG. 5A, messaging application 220 may cause user device 210 to provide a user interface that enables Bev to send the self-destructing message to Britt. As further shown as an example in relation to FIG. 5A, Bev may identify Britt as a recipient of the self-destructing message, identify a type of the self-destructing message, and a self-destructing time via the user interface. As further shown as an example in relation to FIG. 5A, Bev may also submit content of the self-destructing message. As further shown in relation to FIG. 5A, assume that Bev has selected a button, labeled "Send," to transmit the self-destructing message.

For the purposes of example 500, further assume that the self-destructing message has been transmitted to server 240 via HTTPS. Further assume that server 240 has encrypted the content of the self-destructing message, transmitted by user device 210, using a key and has transmitted an SMS message, including a link to the encrypted message, to user device 250. Further assume that messaging application 220 of user device 250 has transmitted a request for the encrypted message using the link included in the SMS message.

As shown in relation to FIG. 5B, assume that messaging application 220 of user device 250 has received the encrypted message from server 240 based on transmitting the request for the encrypted message. As shown as an example in relation to FIG. 5B, messaging application 220 of user device 250 may cause user device 250 to display a notification indicating that a self-destructing has been received from Bev and display a message icon representing the self-destructing message. As further shown as an example in relation to FIG. 5B, messaging application 220 of user device 250 may cause user device 250 to display instructions directing Britt to select the message icon to cause the self-destructing message to be displayed. As further shown in relation to FIG. 5B, assume that Britt has selected the message icon.

For the purposes of example 500, further assume that messaging application 220 of user device 250 has transmitted, to server 240 via HTTPS, a request for the key to decrypt the encrypted message and that messaging application 220 of user device 250 has received, from server 240 via HTTPS, the key along with the self-destructing time based on the request.

Figure 5D:
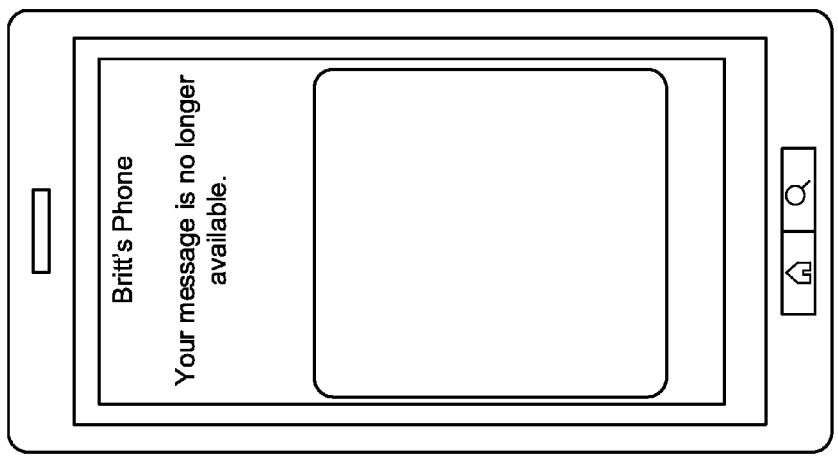
Figure 5C:
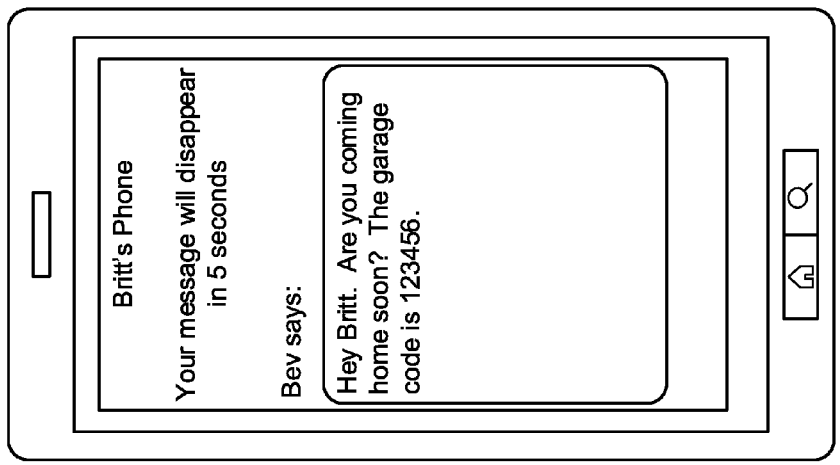

As shown in relation to FIG. 5C, assume that messaging application 220 has decrypted the encrypted message, using the key, to obtain a decrypted message. As shown as an example in relating to FIG. 5C, messaging application 220 of user device 250 may cause the decrypted message to be displayed along with the self-destructing time.

As shown in relation to FIG. 5D, assume that messaging application 220 of user device 250 has detected that the self-destructing time has expired. As shown as an example in relation to FIG. 5D, messaging application 220 of user device 250 may cause the decrypted message to be removed from display after detecting that the self-destructing time has expired. Messaging application 220 may also delete the decrypted message.

As indicated above, FIGS. 5A-5D are provided merely as an example. Other examples are possible and may differ from what was described with regard to FIGS. 5A-5D.

Figure 6A:
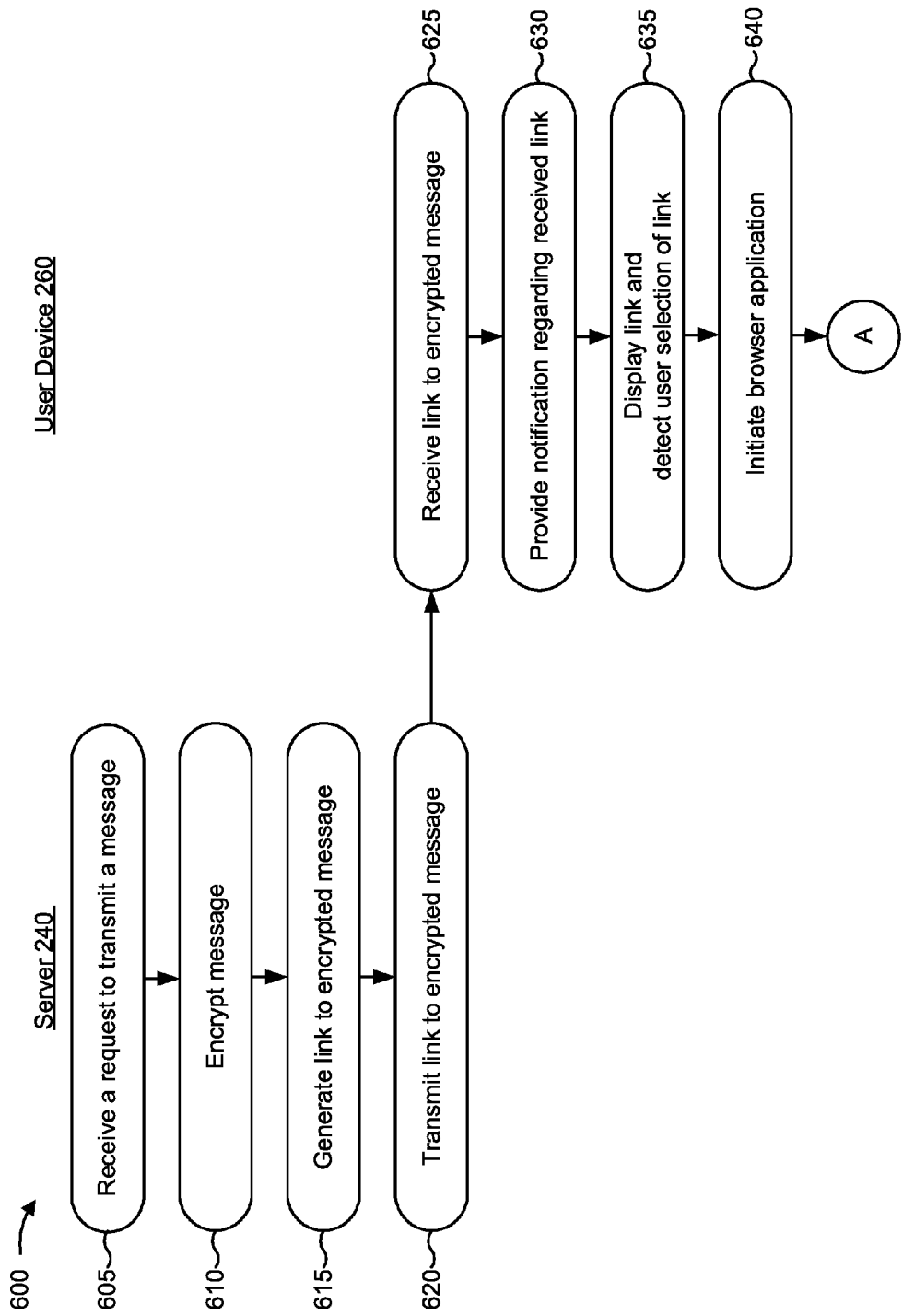
FIGS. 6A and 6B are flow charts of an example process for transmitting and receiving a self-destructing message.
Figure 6B:
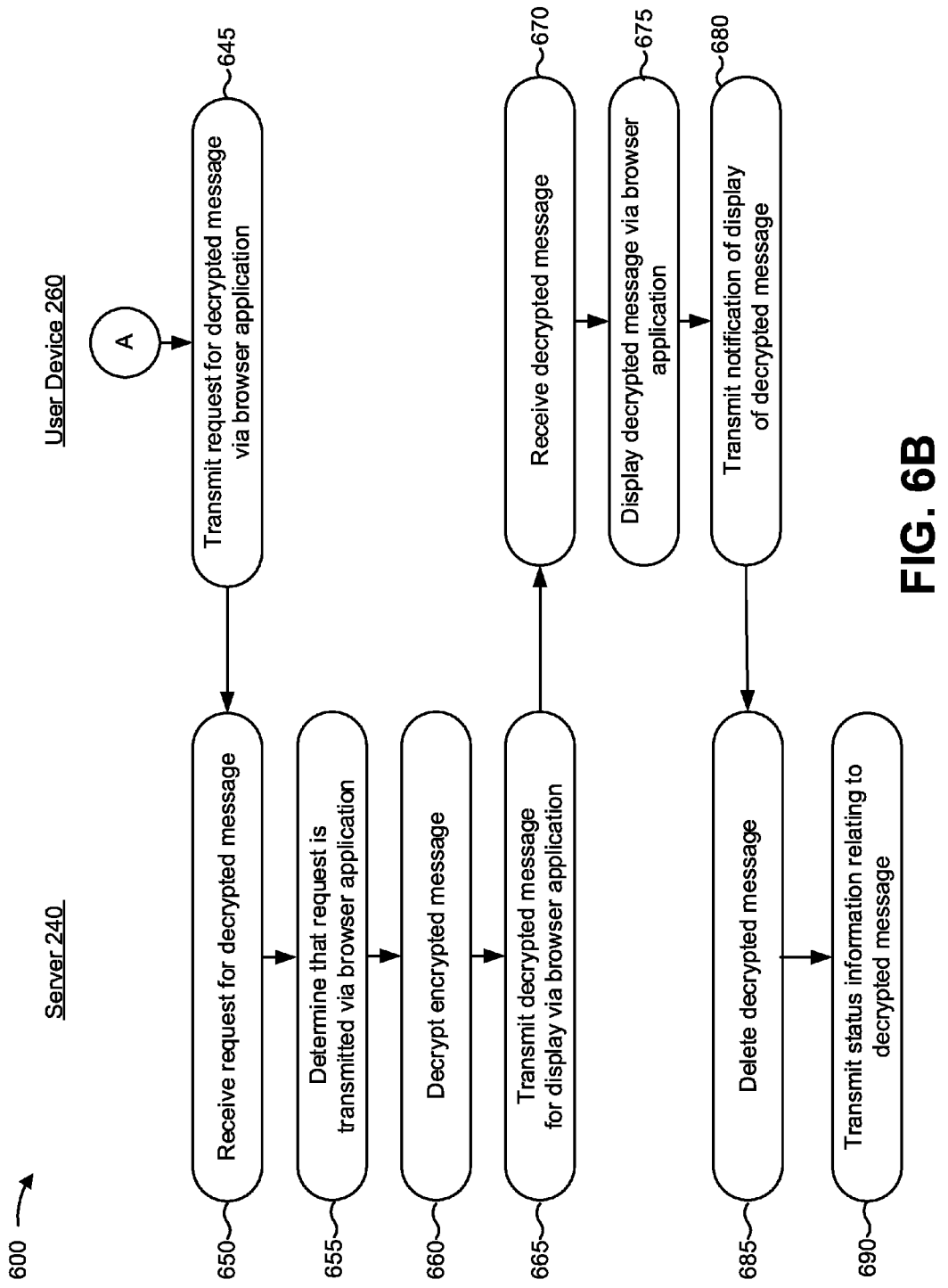

FIGS. 6A and 6B are flowcharts of an example process 600 for transmitting and receiving a self-destructing message. In some implementations, process 600 may be performed by server 240 and user device 260. In some implementations, one or more process blocks of FIGS. 6A and 6B may be performed by another device or a group of devices separate from or including server 240 and user device 260.

As shown in FIG. 6A, process 600 may include receiving a request to transmit a message (block 605). For example, server 240 may receive a request, from user device 210, to transmit a message to user device 260 in a manner similar to that described above with respect to block 404 of process 400. For instance, a user of user device 210 may identify user device 260 as a recipient of the message, identify a type of the message as a self-destructing message, identify a self-destructing time associated with the message, submit content of the message, and submit the request via messaging application 220.

In some implementations, the request may include information similar to that described above with respect to block 404 of process 400. For example, the request may include the content of the message (textual information, visual information (e.g., information identifying an image, information identifying a video, etc.)) and information identifying user device 260. In some implementations, server 240 may store information included in the request in a manner similar to that described above with respect to block 404 of process 400.

As further shown in FIG. 6A, process 600 may include encrypting the message and storing the encrypted message (block 610). For example, server 240 may encrypt and store the content of the message received from user device 210 in a manner similar to that described above with respect to block 408 of process 400. Additionally, or alternatively, server 240 may store information identifying a status associated with the encrypted message. For example, server 240 may store the information identifying the status, associated with the encrypted message, in the memory associated with server 240.

As further shown in FIG. 6A, process 600 may include generating a link to the encrypted message (block 615). For example, after storing the encrypted message, server 240 may generate a link, that may be used by user device 260 to obtain the encrypted message, in a manner similar to that described above with respect to block 412 of process 400.

As further shown in FIG. 6A, process 600 may include transmitting the link to the encrypted message (block 620). For example, after generating the link to the encrypted message, server 240 may transmit the link to user device 260 in a manner similar to that described above with respect to block 416 of process 400. Additionally, or alternatively, server 240 may transmit the link to user device 250 via another type of communication, such as e-mail.

As further shown in FIG. 6, process 600 may include receiving the link to the encrypted message (block 625). For example, user device 260 may receive the link transmitted by server 240. In some implementations, user device 260 may receive the link via a text message. For example, user device 260 may receive an SMS message that includes the link.

As further shown in FIG. 6A, process 600 may include providing a notification regarding the received link (block 630). For example, user device 260 may display, to the user of user device 260 as part of the notification, information indicating that a message has been received from the user of user device 210 based on receiving the link. In some implementations, user device 260 may display graphical information indicating that a message has been received from the user of user device 210. For example, user device 260 may display an icon or a button representing the message. Additionally, or alternatively, user device 260 may display textual information indicating that a message has been received from the user of user device 210. For example, the textual information may include instructions regarding an action, to be performed by the user, to cause the message to be displayed. For instance, the instructions may direct the user to select the icon or the button to cause the self-destructing message to be displayed. Additionally, or alternatively, user device 260 may display the link. Additionally, or alternatively, user device 260 may provide, to a user of user device 260, audible information indicating that the message has been received. Additionally, or alternatively, user device 260 may vibrate or provide another type of sensory feedback to the user of user device 260. In some implementations, the notification may include the link.

As further shown in FIG. 6A, process 600 may include displaying the link and detecting user selection of the link (block 635). For example, after displaying the notification and after the user of user device 260 selects the icon or the button, user device 260 may display the link and detect selection, by the user of user device 260, of the link. For instance, user device 260 may detect selection, by the user of user device 260, of the icon or the button and may display the link to the user of user device 260 based on detecting the selection of the icon or the button. User device 260 may then detect the selection of the link displayed to the user of user device 260.

As further shown in FIG. 6A, process 600 may include initiating a browser application (block 640). For example, user device 260 may initiate a browser application (e.g., a web browser application) based on detecting the selection of the link. In some implementations, the link may be a URL. Accordingly, user device 260 may initiate the web browser application to access a site (e.g., a web site) identified by the URL.

As shown in FIG. 6B, process 600 may include transmitting a request for a decrypted message (block 645). For example, user device 260 may transmit the request for a decrypted message corresponding to the encrypted message, to server 240, via the browser application initiated based on detecting the selection of the link. In some implementations, user device 260 may transmit the request for the decrypted message, to server 240, using the link. In some implementations, user device 260 may transmit the request as an HTTP request or an HTTPS request, to server 240, using the link. In some implementations, the request for the decrypted message may include information indicating that the request was transmitted via the browser application (as opposed to via a messaging application 220) along with information identifying server 240, information identifying the memory associated with server 240, and/or an identifier of the encrypted message included in the link. For example, the request for the decrypted message may include information identifying the browser application.

As further shown in FIG. 6B, process 600 may include receiving the request for the decrypted message (block 650). For example, server 240 may receive the request for the decrypted message transmitted by user device 260.

As further shown in FIG. 6B, process 600 may include determining that the request is transmitted via a browser application (block 655). For example, server 240 may determine that the request, for the decrypted message, is transmitted via the browser application. In some implementations, server 240 may analyze the request to determine that the request, for the decrypted message, is transmitted via the browser application. For example, server 240 may analyze the request to determine that the request includes the information indicating that the request was transmitted via the browser application.

As further shown in FIG. 6B, process 600 may include decrypting the encrypted message (block 660). For example, server 240 may decrypt the encrypted message to obtain the decrypted message based on determining that the request, for the decrypted message, is transmitted via the browser application. In some implementations, server 240 may identify information identifying the memory associated with server 240 and an identifier of the encrypted message, from the request for the decrypted message, and may retrieve the encrypted message from the memory associated with server 240 using the information identifying the memory associated with server 240 and the identifier of the encrypted message. In some implementations, server 240 may retrieve a key, used to encrypt the content of the message, from the memory associated with server 240 and may decrypt the encrypted message, using the key, to obtain the decrypted message. For example, server 240 may search the memory associated with server 240, using the identifier of the encrypted message to identify the key.

As may be apparent, server 240 may not transmit the encrypted message and the key to user device 260 because messaging application 220 may not be installed on user device 260.

As further shown in FIG. 6B, process 600 may include transmitting the decrypted message for display via the browser application (block 665). For example, after decrypting the encrypted message, server 240 may transmit the decrypted message to user device 260 for display via the browser application. For instance, server 240 may transmit a document that includes the decrypted message. In some implementations, server 240 may also transmit information regarding a self-destructing time associated with the decrypted message. For example, server 240 may search the memory associated with server 240, using the identifier of the encrypted message, to identify the self-destructing time. In some implementations, server 240 may transmit the decrypted message and/or the information regarding the self-destructing time via HTTP or HTTPs. For example, server 240 may transmit the decrypted message and/or the information regarding the self-destructing time as an HTTP response or an HTTPS response. For instance, server 240 may transmit HyperText Markup Language (HTML) code that includes the decrypted message (e.g., the content of the message) and/or includes code that causes the decrypted message to be displayed for an amount of time equal to the self-destructing time.

As further shown in FIG. 6B, process 600 may include receiving the decrypted message (block 670). For example, user device 260 may receive the decrypted message and/or the information regarding the self-destructing time transmitted by server 240. For instance, user device 260 may receive the HTML code transmitted by server 240.

As further shown in FIG. 6B, process 600 may include displaying the decrypted message via the browser application (block 675). For example, user device 260 may display the decrypted message, received from server 240, via the browser application. In some implementations, user device 260 may display the decrypted message via the browser application based on the HMTL code received from server 240. For example, user device 260 may execute the HTML code to display the decrypted message (e.g., via a document, such as a web page) during the self-destructing time. After expiration of the self-destructing time, the HTML code may cause the decrypted message to be removed from the browser application. In some implementations, when the information regarding the self-destructing time is not transmitted with the decrypted message, server 240 may remove the decrypted message after expiration of the self-destructing time. For example, server 240 may remove the decrypted message from the document that includes the decrypted message and may transmit instructions to cause the browser application to reload the document after the decrypted message has been removed from the document.

As further shown in FIG. 6B, process 600 may include transmitting a notification of display of the decrypted message (block 680). For example, after displaying the decrypted message, user device 250 may transmit, to server 240, the notification of display of the decrypted message in a manner similar to that described above with respect to block 480 of process 400.

As further shown in FIG. 6B, process 600 may include deleting the decrypted message (block 685). For example, based on receiving the notification, server 240 may delete the encrypted message from the memory associated with server 240 in a manner similar that described above with respect to block 488 of process 400. This causes the message to be removed from user device 260.

As further shown in FIG. 6B, process 600 may include transmitting status information relating to the decrypted message (block 690). For example, after receiving the notification of display of the decrypted message, server 240 may transmit the status information to user device 210 in a manner similar that described above with respect to block 492 of process 400.

Although FIGS. 6A and 6B show example blocks of process 600, in some implementations, process 600 may include additional blocks, fewer blocks, different blocks, or differently arranged blocks than those depicted in FIGS. 6A and 6B. Additionally, or alternatively, two or more of the blocks of process 600 may be performed in parallel.

FIGS. 7A-7E are diagrams of an example 700 of process 600 described above with respect to FIGS. 6A and 6B. For the purposes of example 700, assume that messaging application 220 has been installed onto user device 250 but not onto user device 260. Further assume that Britt, a user associated with user device 250, has initiated messaging application 220 to transmit a self-destructing message to Whit, a user associated with user device 260.

As shown in relation to FIG. 7A, messaging application 220 may cause user device 250 to provide a user interface that enables Britt to send the self-destructing message to Whit. As further shown as an example in relation to FIG. 7A, Britt may identify Whit as a recipient of the self-destructing message, identify a type of the self-destructing message, and a self-destructing time via the user interface. As further shown as an example in relation to FIG. 7A, Britt may also submit content of the self-destructing message. As further shown in relation to FIG. 7A, assume that Britt has selected a button, labeled Send, to transmit the self-destructing message.

For the purposes of example 700, further assume that the self-destructing message has been transmitted to server 240 via HTTPS. Further assume that server 240 has encrypted the content of the self-destructing message, transmitted by user device 240, using a key and has transmitted an SMS message, including a link to the encrypted message, to user device 260. Further assume that user device 260 has received the SMS message.

As shown as an example in relation to FIG. 7B, user device 260 may display a notification indicating that a message has been received from Britt and display an icon representing the message. As further shown as an example in relation to FIG. 7B, user device 260 may display instructions directing Whit to select the icon to cause the message to be displayed. As further shown in relation to FIG. 7B, assume that Whit has selected the icon.

As shown as an example in relation to FIG. 7C, user device 260 may display information indicating that Whit has received a self-destructing message from Britt. As shown as an example in relation to FIG. 7C, user device 260 may display a link to the self-destructing message and display instructions directing Whit to select the link to access the self-destructing message. As further shown in relation to FIG. 7C, assume that Whit has selected the link.

For the purposes of example 700, further assume that user device 260 has transmitted, to server 240 via HTTPS, a request for the self-destructing message based on Whit selecting the link. Further assume that, based on the request, server 240 has obtained the encrypted message and the key and has decrypted the encrypted message, using the key, to obtain the decrypted message. Further assume that server 240 has transmitted, to user device 260, HTML code that includes the decrypted message (e.g., including the content of the message) and code to cause the content of the message to be displayed for the self-destructing time.

Figure 7D:
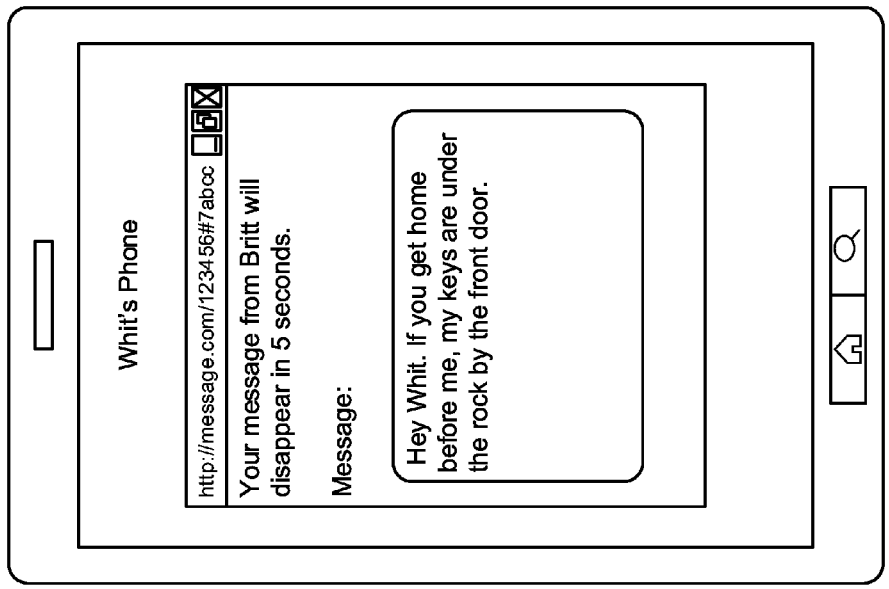

As shown in relation to FIG. 7D, assume that user device 260 has initiated a web browser application based on Whit selecting the link and has received the HTML code. As shown as an example in relating to FIG. 7D, user device 260 may display the decrypted message via the web browser application during the self-destructing time.

Figure 7E:
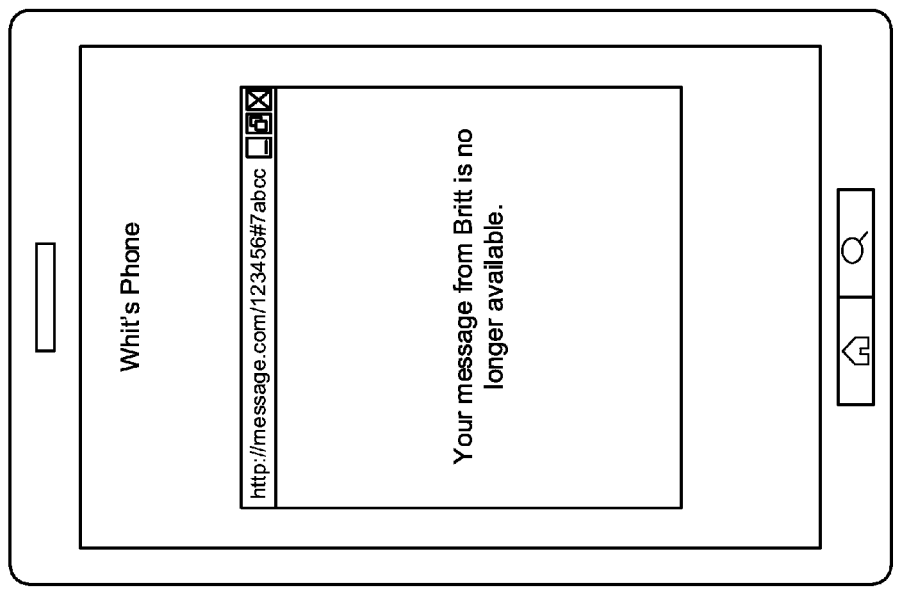

As shown in relation to FIG. 7E, assume that the self-destructing time has expired. Server 240 may delete the message after the self-destructing time has expired. This may cause the decrypted message to be removed from display on user device 260. As shown as an example in relation to FIG. 7E, the decrypted message may be removed from display.

As indicated above, FIGS. 7A-7E are provided merely as an example. Other examples are possible and may differ from what was described with regard to FIGS. 7A-7E.

Systems and/or methods, described herein, may enable the transmission and receipt of self-destructing messaging and may ensure the protection of content of the self-destructing messages during the transmission and receipt.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

To the extent the aforementioned implementations collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that example aspects, as described above, may be implemented in many different forms of firmware, hardware, or a combination of hardware and software in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device comprising:
a memory to store instructions; and
one or more processors to execute the instructions to:
receive, from a first user device, a request to transmit a message to a user of a second user device,
the request to transmit the message including content of the message,
the request to transmit the message including particular information indicating that the content of the message is to be displayed to the user for a particular amount of time,
the particular information including: information identifying a type of the message as a self-destructing message, and information identifying the particular amount of time,
encrypt, based on receiving the request to transmit the message, the content of the message to obtain an encrypted message,
the content of the message being encrypted using a key,
the key being generated based on the particular information,
transmit the encrypted message to the second user device,
receive, from the second user device, a request for the key,
the request for the key being received based on transmitting the encrypted message to the second user device,
transmit the key to the second user device after receiving the request for the key, and
transmit, to the second user device, information identifying the particular amount of time, the information identifying the particular amount of time and the key being transmitted to the second device to cause the second user device to decrypt the encrypted message, using the key, to obtain a decrypted message and to cause the second user device to delete the decrypted message after the particular amount of time.

2. The device of claim 1,
where the information identifying the type of the message and the information identifying the particular amount of time is identified by a user of the first user device.

3. The device of claim 1, where the one or more processors are further to:
determine the particular amount of time based on a size of the content of the message.

4. The device of claim 1, where the one or more processors are further to:
generate a link to the encrypted message, and
transmit, to the second user device, the link to the encrypted message via a short message service (SMS) message.

5. The device of claim 4, where the one or more processors are further to:
receive, from the second user device, a request for the encrypted message,
the link being used by the second user device to transmit the request for the encrypted message, and
the encrypted message being transmitted to the second user device based on receiving the request for the encrypted message.

6. The device of claim 1, where the one or more processors are further to:
generate the key based on:
the particular information, and
at least one of:
the content of the message, or
information identifying the second user device.

7. The device of claim 1, where the one or more processors are further to:
receive, from the second user device, information indicating that the content of the message has been displayed by the second user device, and
transmit, to the first user device, information indicating that the content of the message has been displayed based on receiving the information indicating that the content of the message has been displayed by the second user device.

8. The device of claim 1, where, when transmitting the information identifying the particular amount of time, the one or more processors are to:
transmit the information identifying the particular amount of time with:
the encrypted message, or
the key.

9. A method comprising:
receiving, by a server and from a first device, a request to transmit a message to a user of a second device,
the request to transmit the message including content of the message,
the request to transmit the message including particular information indicating that the content of the message is to be displayed to the user for a particular amount of time,
the particular information including: information identifying a type of the message as a self-destructing message, and information identifying the particular amount of time;
encrypting, by the server and based on receiving the request to transmit the message, the content of the message to obtain an encrypted message,
the content of the message being encrypted using a key, the key being generated based on the particular information;
transmitting, by the server, the encrypted message to the second device;
receiving, by the server and from the second device, a request for the key,
the request for the key being received based on transmitting the encrypted message to the second device; and
transmitting, by the server, information identifying the particular amount of time and the key to the second device after receiving the request for the key,
the information identifying the particular amount of time and the key being transmitted to the second device to cause the second device to decrypt the encrypted message, using the key, to obtain a decrypted message and to cause the second device to delete the decrypted message after the particular amount of time following display of the decrypted message to the user.

10. The method of claim 9, further comprising:
determining the particular amount of time based on:
a size of the content of the message, or
a plurality of amounts of time associated with displaying content of a plurality of messages.

11. The method of claim 9, further comprising:
generating the key based on:
the particular information, and
at least one of:
the content of the message, or
information identifying the second device.

12. The method of claim 9, further comprising:
receiving, from the second device, a request for the encrypted message,
where receiving the request to transmit the message includes:
receiving the request to transmit the message via a first Hypertext Transfer Protocol (HTTP) request or a first Hypertext Transfer Protocol Secure (HTTPS) request,
where receiving the request for the encrypted message includes:
receiving the request for the encrypted message via a second HTTP request or a second HTTPS request,
where transmitting the encrypted message includes:
transmitting the encrypted message as a first HTTP response or a first HTTPS response.

13. The method of claim 12, where receiving the request for the key includes:
receiving the request for the encrypted message via a third HTTP request or a third HTTPS request, and
where transmitting the information identifying the particular amount of time and the key includes:
transmitting the information identifying the particular amount of time and the key as a second HTTP response or a second HTTPS response.

14. The method of claim 9, further comprising:
generating a link to the encrypted message;
transmitting, to the second device, the link to the encrypted message; and
receiving, from the second device, a request for the encrypted message, the link being used by the second device to transmit a request for the encrypted message.

15. The method of claim 14, where transmitting the link to the encrypted message comprises:
transmitting the link to the encrypted message via a short message service (SMS) message.

16. A computer-readable medium storing instructions, the instructions comprising:
one or more instructions which, when executed by one or more processors of a server, cause the one or more processors to:
receive, from a first device, a request to transmit a message to a user of a second device,
the request to transmit the message including content of the message,
the request to transmit the message including particular information indicating that the content of the message is to be displayed to the user for a particular amount of time,
the particular information including: information identifying a type of the message as a self-destructing message, and information identifying the particular amount of time;
encrypt, based on receiving the request to transmit the message, the content of the message to obtain an encrypted message,
the content of the message being encrypted using a key,
the key being generated based on the particular information;
transmit a link to the encrypted message to the second device;
receive, from the second device, a request for a decrypted message corresponding to the encrypted message,
the request for the decrypted message being received based on transmitting the link to the encrypted message;
decrypt the encrypted message to obtain the decrypted message based on receiving the request for the decrypted message,
the encrypted message being decrypted using the key;
transmit the decrypted message to the second device based on receiving the request for the decrypted message; and
cause the decrypted message to be removed from a display of the second device after the particular amount of time.

17. The computer-readable medium of claim 16, where the one or more instructions to transmit the decrypted message include:
one or more instructions to transmit code that includes the decrypted message and includes code that causes the decrypted message to be displayed for only the particular amount of time.

18. The computer-readable medium of claim 16, where the instructions further comprise:
one or more instructions to determine that the request for the decrypted message is received via a web browser application,
where the one or more instructions to decrypt the encrypted message include:
one or more instructions to decrypt the encrypted message based on determining that the request for the decrypted message is received via the web browser application, and
where the one or more instructions to transmit the decrypted message include:
one or more instructions to transmit the decrypted message for display via the web browser application.

19. The computer-readable medium of claim 18, where the one or more instructions to receive the request to transmit the message include:
one or more instructions to receive the request to transmit the message via an Hypertext Transfer Protocol (HTTP) request or an Hypertext Transfer Protocol Secure (HTTPS) request.

20. The computer-readable medium of claim 16, where the instructions further include:
one or more instructions to determine the particular amount of time based on a size of the content of the message.

* * * * *